US012682702B2

(12) United States Patent
Lee et al.

(10) Patent No.: US 12,682,702 B2
(45) Date of Patent: Jul. 14, 2026

(54) VEHICLE DIAGNOSIS APPARATUS AND METHOD THEREOF

(71) Applicants: Hyundai Motor Company, Seoul (KR); Kia Corporation, Seoul (KR)

(72) Inventors: Tae Hee Lee, Hwaseong-si (KR); Kyung Woo Lee, Hwaseong-si (KR); Young Rock Chung, Hwaseong-si (KR); Dae Un Sung, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 8 days.

(21) Appl. No.: 18/910,496

(22) Filed: Oct. 9, 2024

(65) Prior Publication Data

US 2025/0124750 A1     Apr. 17, 2025

(30) Foreign Application Priority Data

Oct. 11, 2023     (KR) ........................ 10-2023-0135156

(51) Int. Cl.
 *G07C 5/08*          (2006.01)
 *B62D 5/04*          (2006.01)
(52) U.S. Cl.
 CPC .........  *G07C 5/0808* (2013.01); *B62D 5/0487* (2013.01); *G07C 5/0825* (2013.01); *G07C 5/085* (2013.01)
(58) Field of Classification Search
 CPC ... B62D 5/0487; G07C 5/0808; G07C 5/0816
 See application file for complete search history.

(56) References Cited

U.S. PATENT DOCUMENTS

| | | | |
|---|---|---|---|
| 2019/0102689 A1 | 4/2019 | Lassoued et al. | |
| 2023/0012186 A1* | 1/2023 | Siegel | .................. G07C 5/0833 |

FOREIGN PATENT DOCUMENTS

| | | |
|---|---|---|
| JP | 2011203116 A | 10/2011 |
| JP | 2021140297 A | 9/2021 |
| KR | 102198725 B1 | 1/2021 |
| KR | 20220069700 A | 5/2022 |
| KR | 20220130383 A | 9/2022 |

* cited by examiner

*Primary Examiner* — Wade Miles
*Assistant Examiner* — Zachary Joseph Wallace
(74) *Attorney, Agent, or Firm* — Slater Matsil, LLP

(57)     ABSTRACT

An apparatus for inspecting a host vehicle can include a memory configured to store failure diagnosis model information for each of vehicle parts, where the failure diagnosis model information is obtained while a test vehicle equipped with each of the vehicle parts in a failure state is driving, a sensor configured to generate information on driving conditions of a road on which the host vehicle is currently traveling and a status of the host vehicle, a controller configured to compare the information generated by the sensor with the failure diagnosis model information to determine whether a road surface condition is consistent with each other, and determine whether a vehicle part has failed in response that the road surface condition is consistent with each other, and a displayer configured to display a warning sign of a failure according to a control signal provided by the controller.

20 Claims, 10 Drawing Sheets

131

FIRST NOISE SENSOR

FIFTH NOISE SENSOR

135

FOURTH NOISE SENSOR

134

SECOND NOISE SENSOR

132

THIRD NOISE SENSOR

133

X

Y

Z

Time

Time x y z

Time

Time

1

VEHICLE DIAGNOSIS APPARATUS AND METHOD THEREOF

CROSS-REFERENCE TO RELATED APPLICATIONS

The present application claims priority to Korean Patent Application No. 10-2023-0135156, filed on Oct. 11, 2023, the entire contents of which is incorporated herein for all purposes by this reference.

TECHNICAL FIELD

The present disclosure relates to an apparatus and a method for inspecting a vehicle for failures.

BACKGROUND

The statements in this section merely provide background information related to the present disclosure and may not constitute prior art.

To determine whether there are defects or failures of major parts in a vehicle, sensors mounted on the parts have been used, and the inspection results have been delivered to a driver through a display device such as a cluster around the driver's seat, allowing the driver to check for any defects or failures in the major parts. Vibration data has been often used to determine a failure of a vehicle component, but is greatly affected by the road surface. Therefore, vibration caused by the failure of the component mixes with vibration caused by the road surface, making it difficult to determine the failure. The vibration caused by the road surface and the vibration caused by the failure of the component are confused, making it impossible to determine the failure accurately.

The information included in this Background of the present disclosure section is only for enhancement of understanding of the general background of the present disclosure and may not be taken as an acknowledgement or any form of suggestion that this information forms the prior art already publicly known, available, or in use.

SUMMARY

The present disclosure relates to an apparatus and a method for inspecting a vehicle for failures, and, more particularly, to an apparatus for inspecting a vehicle that determines a failure of a vehicle component when it is determined that the road surface on which the vehicle is currently driving is consistent with the road surface of a learned model and a method of inspecting a vehicle using the same.

An embodiment of the present disclosure can provide an apparatus and a method for determining a failure of a vehicle part quickly and accurately.

An apparatus and method for inspecting a vehicle according to an embodiment of the present disclosure can boost the accuracy of the inspection by determining whether a part is broken when it is determined that the vehicle is driving on the same road surface as the road surface verified through a model.

Accordingly, an apparatus for inspecting a host vehicle according to an embodiment of the present disclosure may include a memory configured to store failure diagnosis model information for each of vehicle parts, wherein the failure diagnosis model information is obtained while a test vehicle equipped with each of the vehicle parts in a failure state is driving, a sensor configured to generate information on driving conditions of a road on which the host vehicle is currently traveling and a status of the host vehicle, a controller configured to compare the information generated by the sensor with the failure diagnosis model information to determine whether a road surface condition is consistent with each other, and determine whether a vehicle part has failed in response that the road surface condition is consistent with each other, and a displayer configured to display a warning sign of a failure according to a control signal provided by the controller.

In at least one embodiment according to the present disclosure, the failure diagnosis model information can be generated with the test vehicle driven at a constant speed of 50 km/h to 60 km/h on a flat road.

In at least one embodiment according to the present disclosure, the failure diagnosis model information can comprise at least one of acceleration data, vibration data, sound data, and GPS data.

In at least one embodiment according to the present disclosure, the sensor can include an acceleration sensor configured to measure acceleration on a road surface on which the host vehicle is traveling, a vibration sensor configured to sense vibration of the vehicle part, a noise sensor configured to sense sounds generated from the vehicle part, and a GPS configured to generate data on a location of the host vehicle.

In at least one embodiment according to the present disclosure, the vibration sensor and the noise sensor can be placed at one or more of a position inside the front body of the host vehicle, a position around the motor of the host vehicle, a position around a wheel of the host vehicle, a position around a battery of the host vehicle, and a position inside a rear body of the host vehicle.

In at least one embodiment according to the present disclosure, the sensor may include a filter configured to remove noise from data received from the vibration sensor and the noise sensor.

In at least one embodiment according to the present disclosure, the controller can inspect different vehicle parts for failures in a turning section and a straight section of driving of the host vehicle.

In at least one embodiment according to the present disclosure, the controller can determine whether a motor driven power steering (MDPS) is broken in the turning section and determines whether an electric driving motor is broken in the straight section.

A method of inspecting a vehicle according to an embodiment of the present disclosure may include storing failure diagnosis model information for each of vehicle parts in a memory, where the failure diagnosis model information is obtained while a test vehicle equipped with each of the vehicle parts in a failure state is driving, generating information on driving conditions of a road on which the host vehicle is currently traveling and a status of the host vehicle, determining whether a road surface condition of the road is consistent with a road surface condition stored in the memory, comparing the information generated by the sensor with the failure diagnosis model information and determining whether a vehicle part has failed in response that the road surface condition is consistent, and alerting a driver of the host vehicle that the vehicle part has failed.

In a method of at least one embodiment according to the present disclosure, the generated information can include vibration data of parts of the host vehicle, sounds data generated from parts of the host vehicle, and location data of the host vehicle.

In a method of at least one embodiment according to the present disclosure, the determining of whether a vehicle part has failed can include inspecting different vehicle parts for failures in a turning section and a straight section of driving of the host vehicle In a method of at least one embodiment according to the present disclosure, the determining of whether a vehicle part has failed can further include determining whether a motor driven power steering (MDPS) is broken in the turning section and determining whether an electric driving motor is broken in the straight section The apparatus and the method for inspecting a vehicle according to the present disclosure may have the following advantages.

In an embodiment of the present disclosure, whether a vehicle component is broken may be determined when it is determined that the road surface on which the vehicle is currently driving is consistent with the road surface of a learned model, thereby improving the reliability of the inspection and boosting the utility of the model.

In an embodiment of the present disclosure, the parts inspected for failures may vary depending on the obtained information on the road surface.

The methods and apparatuses of an embodiment of the present disclosure can have other features and advantages that can be apparent from or are set forth in more detail in the accompanying drawings, which are incorporated herein, and the following Detailed Description, which together can serve to explain certain principles of the present disclosure.

Figure 1:
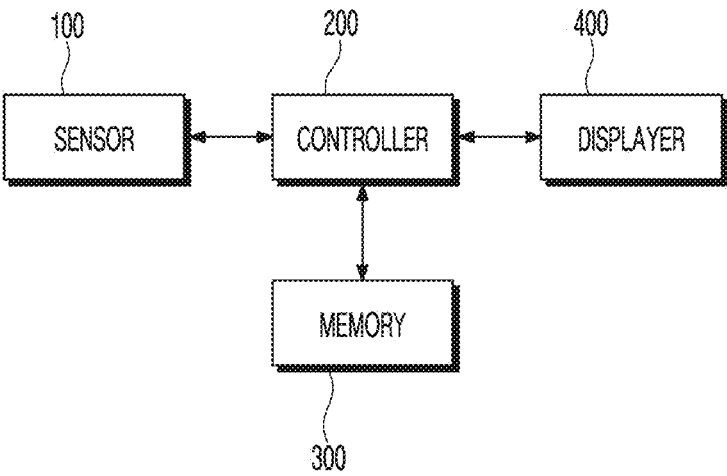
FIG. 1 is a block diagram for showing internal components of an apparatus for inspecting a vehicle according to an embodiment of the present disclosure.

It may be understood that the appended drawings are not necessarily to scale, presenting a somewhat simplified representation of various features illustrative of the principles of the present disclosure. The specific design features of an embodiment of the present disclosure as included herein, including, for example, specific dimensions, orientations, locations, and shapes, can be determined in part by a given particularly intended application and use environment.

In the figures, same reference numerals can refer to same or equivalent parts of example embodiments of the present disclosure throughout the several figures of the drawing.

DETAILED DESCRIPTION OF ILLUSTRATIVE EMBODIMENTS

As for the example embodiments of the present disclosure disclosed below, descriptions of specific structures or functions are provided solely for the purpose of describing the example embodiments of the present disclosure, and embodiments of the present disclosure can be carried out in various forms and should not be deemed to be necessarily limited to the example embodiments described below.

Because the present disclosure can be modified and carried out in various forms, specific example embodiments will be illustrated in the drawings and described in detail below. However, this is not intended to limit the present disclosure to specific disclosed forms, and the present disclosure should be understood to include all changes, equivalents, and substitutes within the technology and technical scopes of the present disclosure.

Ordinal expressions such as "first" and "second" may be used to describe various components, but the components are not necessarily limited by such expressions. Such expressions can be used merely for the purpose of distinguishing one component from another. For example, within the scopes of the present disclosure, a first component can be referred to as a second component, and, similarly, the second component can also be referred to as the first component.

When a component is said to be "coupled" or "connected" to another component, the component may be directly coupled or connected to the other component or there may be other components therebetween. On the other hand, when a component is referred to as being "directly coupled" or "directly connected" to another component, there are no other components therebetween. Other expressions that describe relationships between components, such as "between . . . " or "immediately between . . . " and "adjacent to . . . " or "directly adjacent to . . . ," can be interpreted in a same or similar manner.

Terms used herein can be used to describe specific example embodiments and are not intended to necessarily limit the present disclosure. Expressions in the singular form can include a meaning being the plural form unless they clearly mean otherwise in the context. In the present disclosure, expressions such as "comprise" or "have" are intended to indicate the presence of the described features, numbers, steps, operations, components, parts, or combinations thereof, and should not be understood as precluding the possibility of the presence or the addition of one or more other features, numbers, steps, operations, components, parts, or combinations thereof.

Unless otherwise defined, terms used herein, including technical or scientific terms, can have meanings commonly understood by a person having ordinary skill in the technical field to which the present disclosure pertains. Terms defined in commonly used dictionaries can be interpreted as having meanings consistent with the meanings they have in the context of the relevant technology.

When an embodiment can be carried out in a different way, functions, or operations specified in a specific block can occur in an order different from the order specified in a flowchart of an example embodiment herein. For example, functions, or operations specified in two consecutive blocks may actually be performed substantially simultaneously, or may be performed in a reverse order.

Hereinafter, an apparatus for inspecting a vehicle and a method of inspecting the vehicle using the same according to example embodiments of the present disclosure will be described with reference to the attached drawings.

FIG. 1 shows the apparatus for inspecting a vehicle including a sensor 100, a controller 200, a memory 300, and a displayer 400, any combination of or all of which may be in plural or may include plural components thereof, according to an embodiment of the present disclosure.

The sensor 100 may obtain data on the state of the road surface on which a vehicle is now driving and the state of the vehicle.

The memory 300 may store comparison data for determining whether a component is broken.

The controller 200 may compare the data obtained through the sensor 100 with the data stored in the memory 300 to determine whether a component is broken.

When it is determined that a certain component is broken, the controller 200 may control the displayer 400 to provide a user with information on the failure.

Figure 2:
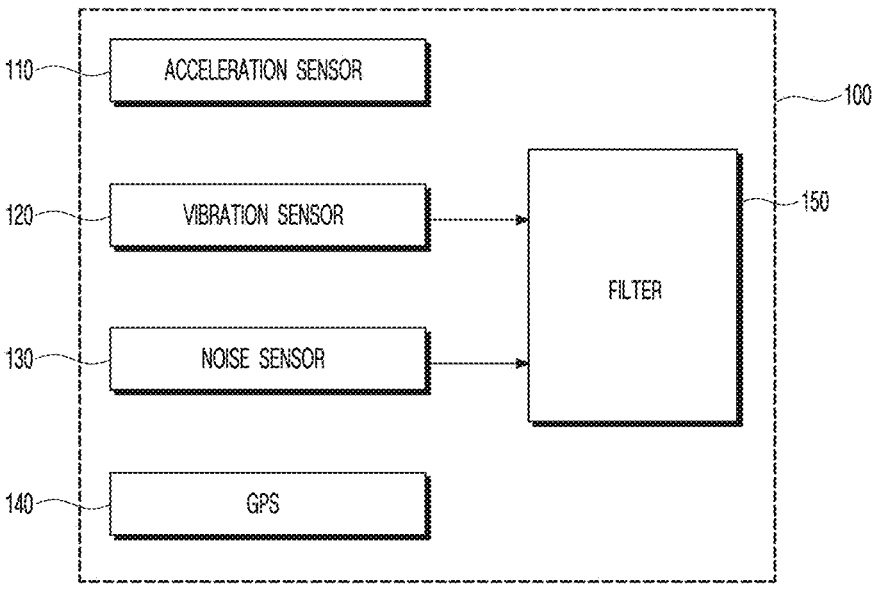
FIG. 2 is a block diagram for showing components of the sensor of the apparatus for inspecting a vehicle according to an embodiment of the present disclosure.

FIG. 2 is a block diagram for showing components of the sensor of the apparatus for inspecting a vehicle according to an embodiment of the present disclosure.

As shown in the drawing, the sensor 100 may include an acceleration sensor 110 that measures the acceleration on the road surface on which a vehicle is traveling, a vibration sensor 120 that senses vibration occurring in vehicle parts, a noise sensor 130 that senses sounds generated from the vehicle parts, a GPS 140 that generates data on the vehicle's location, and a filter 150 that removes noise from data received from the vibration sensor 120 and the noise sensor 130.

The filter 150 may receive data on vibration inside a vehicle from the vibration sensor that senses the vibration inside the vehicle, may receive data on vibration outside the vehicle from another vibration sensor that senses the vibration outside the vehicle, and may mask and remove (filter) the data on the vibration outside the vehicle from the data on the vibration inside the vehicle.

Because the data on the vibration inside the vehicle obtained by the vibration sensor that senses the vibration inside the vehicle may include components of the vibration outside the vehicle, it may be necessary to eliminate the components of the vibration outside the vehicle, which correspond to a noise component, to accurately determine whether there is a problem with the vehicle.

To remove vibration related to noise through the filter 150, for example, the frequency components of each of the data on the vibration inside the vehicle and the data on the vibration outside the vehicle may be analyzed, and the frequency components of the data on the vibration outside the vehicle may be removed from the frequency components of the data on the vibration inside the vehicle.

The filter 150 may receive data on noise inside a vehicle from the noise sensor that senses the noise inside the vehicle, may receive data on noise outside the vehicle from another noise sensor that senses the noise outside the vehicle, and may mask and remove (filter) the data on the noise outside the vehicle from the data on the noise inside the vehicle.

Likewise, because the data on the noise inside the vehicle obtained by the noise sensor that senses the noise inside the vehicle may include components of the noise outside the vehicle, it may be necessary to eliminate the components of the noise outside the vehicle, which correspond to a noise component, to accurately determine whether there is a problem with the vehicle.

Figure 3:
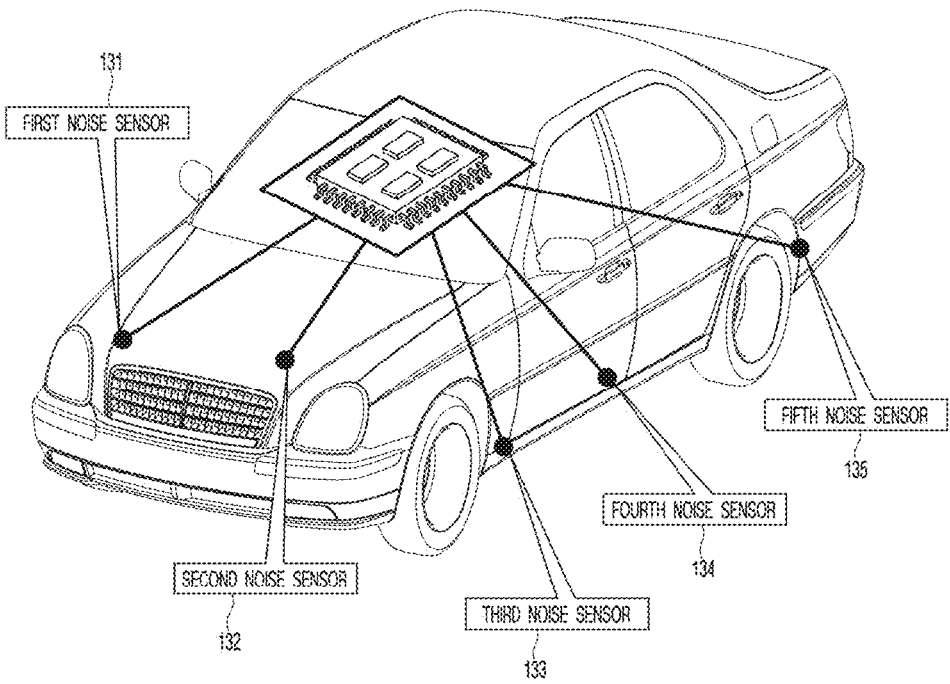
FIG. 3 shows how a plurality of noise sensors are arranged in a vehicle according to an embodiment of the present disclosure.

As shown in FIG. 3, a plurality of vibration sensors and a plurality of noise sensors of the apparatus for inspecting a vehicle according to an embodiment of the present disclosure may be installed inside a front body 131 of a vehicle, around a motor 132 of the vehicle, around wheels 133 of the vehicle, around a battery 134 of the vehicle, and inside a rear body 135 of the vehicle. According to the features of components, the vibration sensor may be placed on a component that can be determined to be broken based on vibration, and the noise sensor may be placed on a component that can be determined to be broken based on a change in sound.

Figure 4:
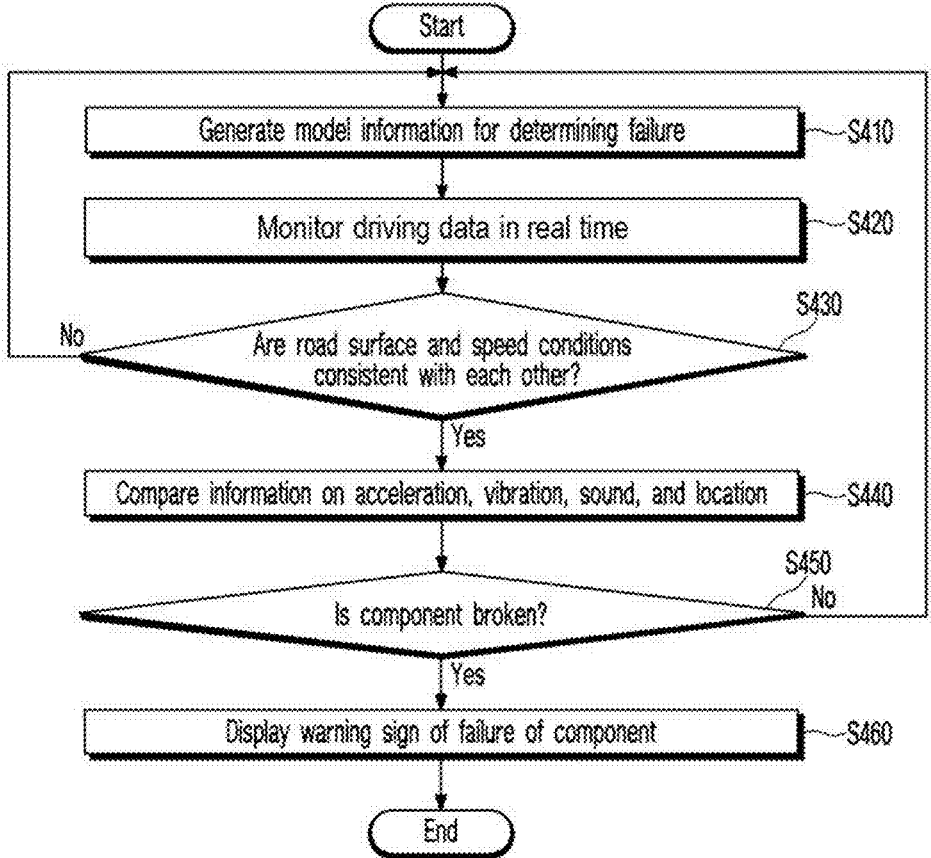
FIG. 4 is a flowchart for showing the progress of a method of inspecting a vehicle according to an embodiment of the present disclosure.

FIG. 4 is a flowchart for showing the progress of a method of inspecting a vehicle according to an embodiment of the present disclosure.

According to an embodiment of the present disclosure, it may be possible to quickly and accurately determine whether a vehicle component has failed by storing a model for determining a failure in the memory in advance and then determining whether the component of a vehicle running under the same road surface conditions is broken.

Figure 5A:
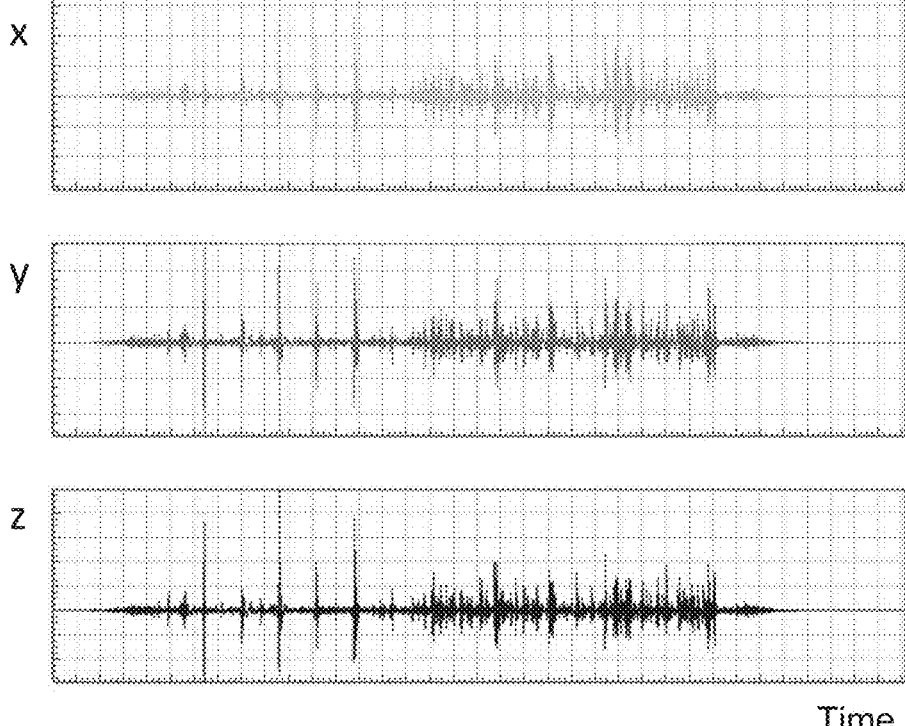
FIGS. 5A to 5D are graphs for showing how failure diagnosis model information is generated according to an embodiment of the present disclosure.
Figure 5B:
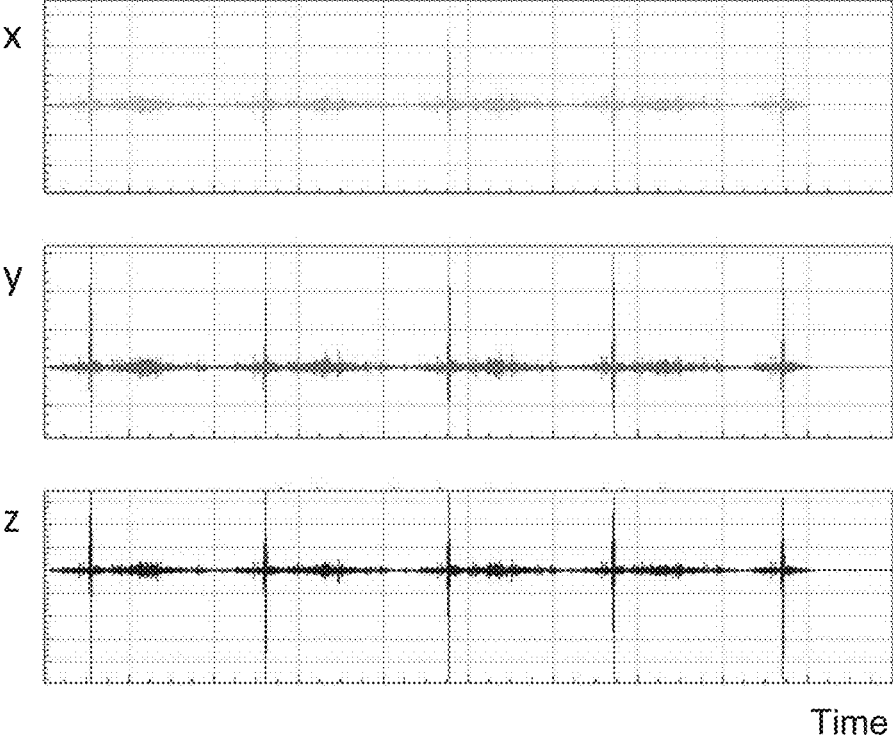

Accordingly, the failure diagnosis model information can be obtained in an environment unaffected by the road surface. Therefore, it may be necessary to collect failure data only on a specific road surface. Vibration data may be obtained while a vehicle equipped with a component determined to be defective is driven at a constant speed of 50 to 60 km/h on a general flat road. For example, the graph in FIG. 5A shows vibration data obtained at a driver's seat in the x, y, and z axes. As shown in the drawing, the vibration data obtained in each axis shows three large peak values. When the vibration data is obtained on a road with bumps rather than a regular road, five large peak values may appear in each axis, as shown in FIG. 5B. Therefore, to obtain the failure diagnosis model information, road surface conditions that may affect vibration or noise data, such as drain covers, bumps, steps, and rutted roads, may be excluded. According to an embodiment, vibration data can be obtained as failure diagnosis model information while a vehicle equipped with a component determined to be defective is driven at a constant speed of 50 to 60 km/h on a flat road, but acceleration data, noise or sound data, or location data or GPS signals may be obtained while a vehicle is driven at the same speed under the same road surface conditions to be used as the model data for determining a failure.

Figure 5C:
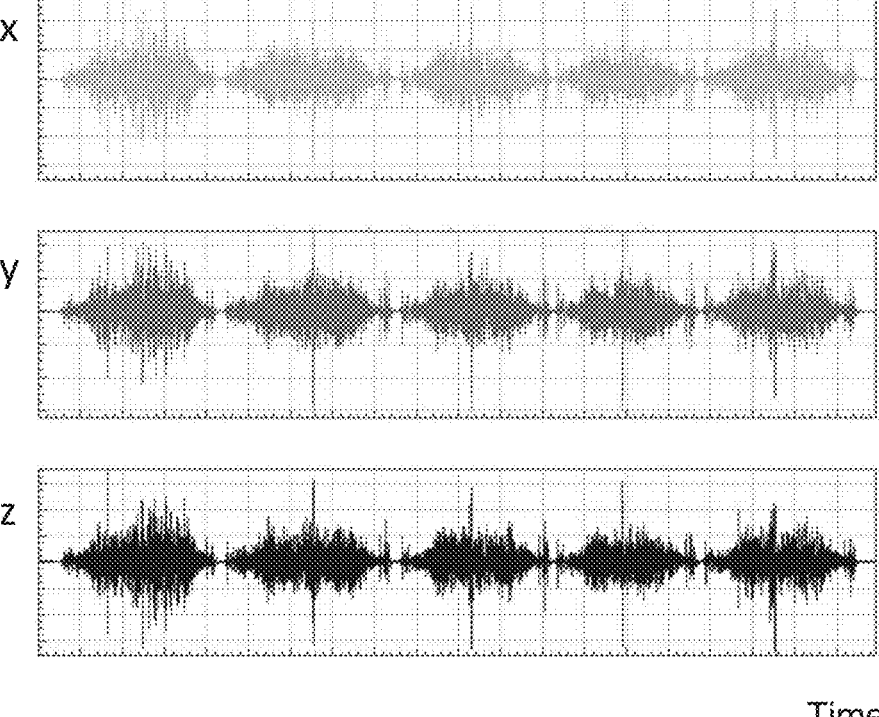
Figure 5D:
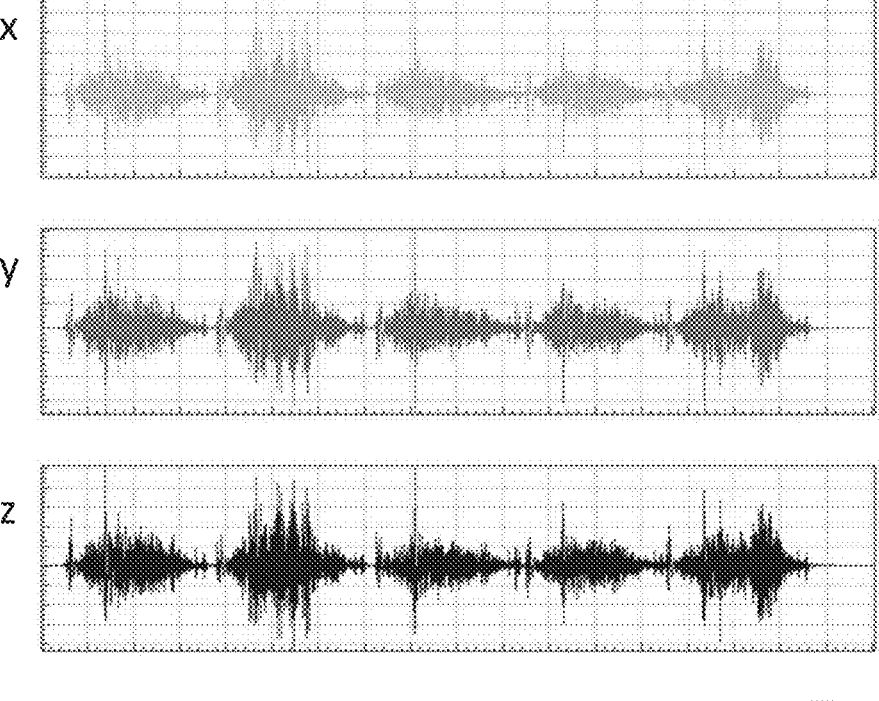

Even when obtained on the same road surface, values of vibration data value may vary depending on a driving speed. For example, FIG. 5C shows the values of vibration data measured while a vehicle is driven at a speed of 60 km/h, and FIG. 5D shows the values of vibration data measured while the vehicle is driven at a speed of 80 km/h. As shown in the drawings, even on the same road surface, vibration data of a failed part may vary depending on a driving speed. It may be desirable to use the pattern of the vibration data of the broken component measured while a vehicle is driven at a speed of 60 km/h as the model for determining a failure, rather than the pattern of the vibration data measured while the vehicle is driven at a speed of 80 km/h at operation S410.

The sensor 100 may generate information on the driving conditions of the road on which a vehicle is currently traveling and the status of the vehicle. The driving conditions of the road may be determined differently for each of the vehicle's straight section and turning section. For example, when checking whether the vehicle's motor device is broken in a straight section, it may be determined whether the electric driving motor thereof is broken because a motor driven power steering (MDPS) does not operate in a straight section. When the vehicle is driving in a turning section, the vibration data of the MDPS may be obtained. As mentioned above, in that case, the plurality of vibration sensors and the plurality of noise sensors arranged in the vehicle may selectively or temporarily transmit sensing results to the controller 200 at predetermined intervals at operation S420.

The controller 200 may determine whether the road surface conditions of the road on which a vehicle is currently driving are consistent with the road surface conditions stored in the memory. For example, when the failure diagnosis model information stored in the memory has been obtained by storing the pattern of vibration data while driving a vehicle equipped with a part determined to be faulty at a speed of 50 km/h on a flat road, it may be determined whether the state of the road surface on which the vehicle is traveling and the speed of the vehicle are consistent with the state of the road surface and the speed of the vehicle at the time of obtaining the failure diagnosis model information at operation S430.

When the road surface conditions and the speed of the vehicle are consistent with those of the failure diagnosis model information, the controller 200 may compare information on the current state of the vehicle with the data stored in the memory to determine whether a part of the vehicle is broken at operation S440.

For example, when the failure diagnosis model information for determining a failure has been stored in the memory with a vehicle equipped with an electric driving motor that has been determined to have failed and another vehicle is currently being driven under the same road surface conditions and the same driving speed conditions, whether the electric driving motor is broken may be determined by determining whether the vibration data of the electric driving motor provided by the sensor 100 is consistent with the data stored in the memory. Whether the two data are consistent with each other may be determined with different error ranges for each part at operation S450.

For example, when an electric driving motor installed in a running vehicle has been determined to be broken, the controller may alert a driver of the vehicle to the failure of the electric driving motor. That is, the controller may generate a voice message through a speaker installed in the vehicle or display a warning sign of the failure through the display device of the vehicle such as a cluster at operation S460.

Figure 6:
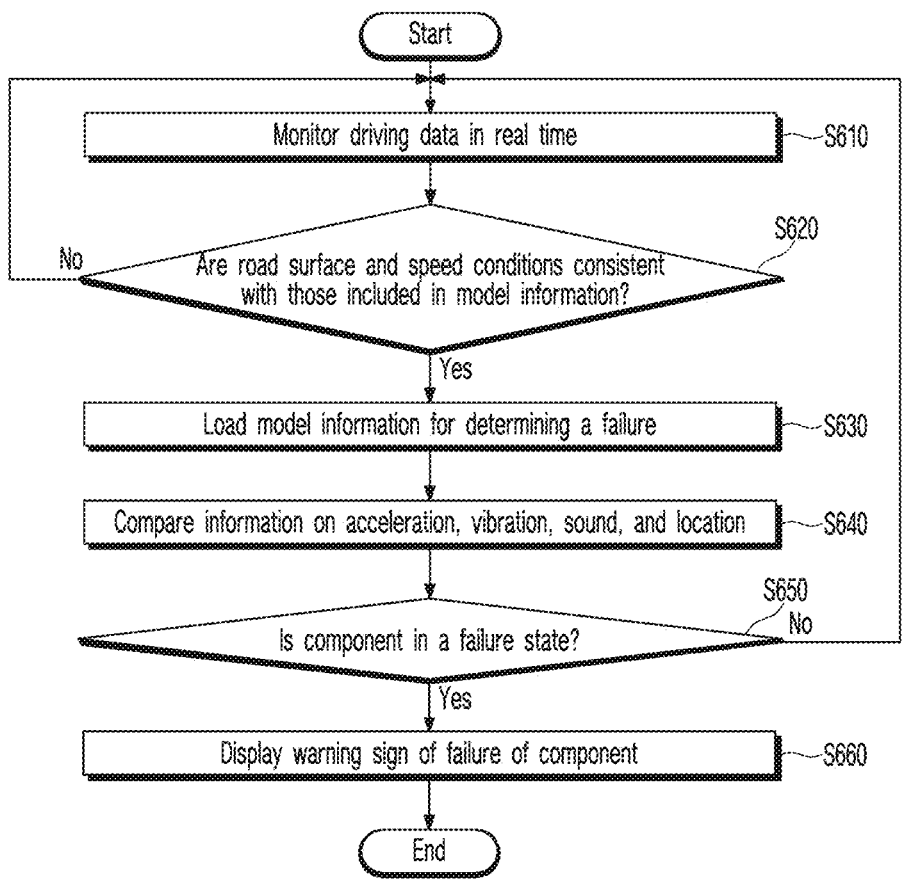
FIG. 6 is a flowchart for showing the progress of the method of inspecting a vehicle according to an embodiment of the present disclosure.
Figure 7:
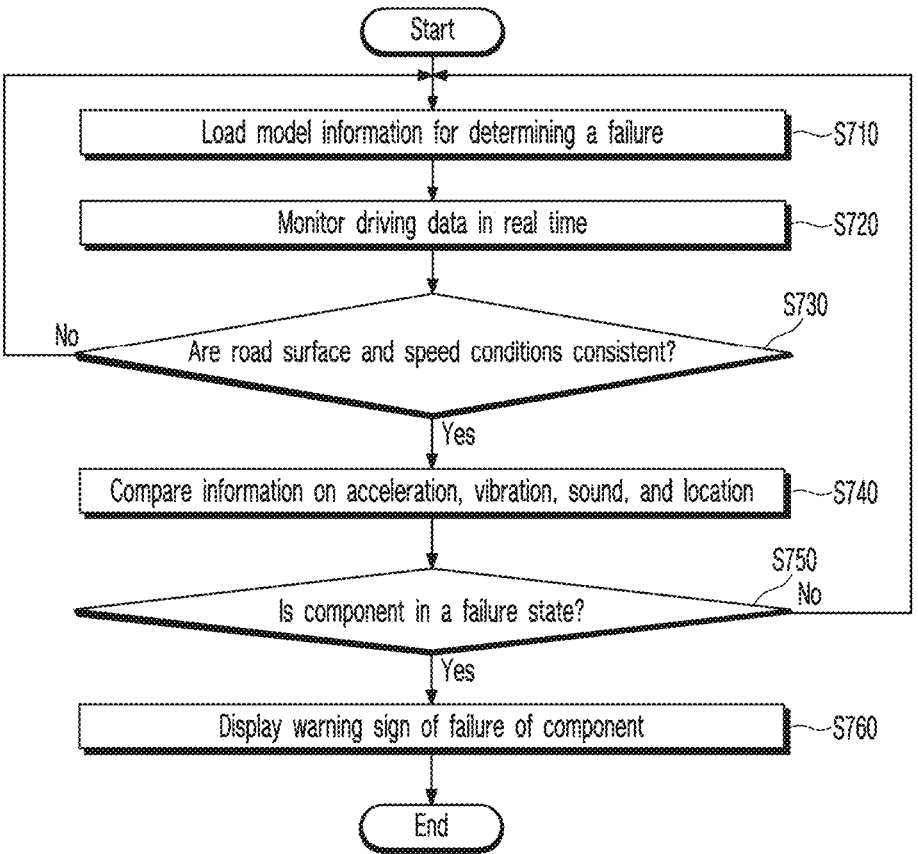
FIG. 7 is a flowchart for showing the progress of the method of inspecting a vehicle according to an embodiment of the present disclosure.

FIG. 6 is a flowchart for showing the progress of a method of inspecting a vehicle according to an embodiment of the present disclosure. FIG. 7 is a flowchart for showing the progress of a method of inspecting a vehicle according to an embodiment of the present disclosure.

FIG. 6 shows a method of determining whether a component in a vehicle is broken while the vehicle is driving normally with the failure diagnosis model information for determining a failure stored in the vehicle's memory. FIG. 7 shows a method of determining whether a certain component of a vehicle is broken when a driver of the vehicle suspects the failure of the component.

For example, referring to FIG. 6, when it is determined that the road surface conditions and the speed conditions are consistent with the road surface conditions and the speed conditions included in the failure diagnosis model information for determining a failure at operation S620 in the process of monitoring driving data in real time at operation S610, the controller may load the failure diagnosis model information for determining a failure stored in the memory at operation S630 and compare the obtained data on acceleration, vibration, noise, and position with the information stored in the memory at operation S640.

The controller 200 may determine whether the vibration data of an electric driving motor provided by the sensor 100 is consistent with the data stored in the memory to determine whether the electric driving motor is broken at operation S650.

When an electric driving motor installed in a running vehicle has been determined to be broken, the controller may alert a driver of the vehicle to the failure of the electric driving motor. That is, the controller may generate a voice message through a speaker installed in the vehicle or display a warning sign of the failure through the display device of the vehicle such as a cluster at operation S660.

When a driver suspects a failure of a certain part of a vehicle, the controller 200 may first load the failure diagnosis model information for determining a failure stored in the memory 300 at operation S710. The acceleration data, vibration data, and noise data of a vehicle part may be obtained by driving the sensor while driving the vehicle under the conditions at the time of generating the failure diagnosis model information for determining a failure at operation S720.

When it is determined that the road surface conditions and the speed conditions are consistent with the road surface conditions and the speed conditions included in the failure diagnosis model information for determining a failure at operation S730, the data on acceleration, vibration, noise, and position obtained by the sensor may be compared with the information stored in the memory at operation S740.

The controller 200 may determine whether the vibration data of an electric driving motor provided by the sensor 100 is consistent with the data stored in the memory to determine whether the electric driving motor is broken at operation S750.

When an electric driving motor installed in a running vehicle has been determined to be broken, the controller may alert a driver of the vehicle to the failure of the electric driving motor. That is, the controller may generate a voice message through a speaker installed in the vehicle or display a warning sign of the failure through the display device of the vehicle such as a cluster at operation S760.

As described above, in an embodiment of the present disclosure, whether a vehicle component is broken may be determined when a vehicle is driving under the road surface conditions and the speed conditions included in failure diagnosis model information for determining whether there is a failure of a vehicle component, which has been stored in advance, so that it may be possible to determine whether the vehicle component is broken quickly and accurately.

The description has been made with reference to example embodiments of the present disclosure, but a person having ordinary skill in the art can understand that various modifications and changes can be made to embodiments of the present disclosure within the technology and scopes of the present disclosure set forth in the following claims.

The foregoing descriptions of the specific example embodiments of the present disclosure have been presented for the purposes of illustration and description. They are not intended to be necessarily exhaustive or to necessarily limit the present disclosure to the precise forms disclosed, and many modifications and variations can be possible in light of the above-described teachings. The example embodiments were chosen and described to explain certain principles of the present disclosure and their practical application, to enable others skilled in the art to make and utilize the various example embodiments of the present disclosure, as well as various alternatives and modifications thereof. It is intended that the scopes of the present disclosure be defined by the claims appended hereto and their equivalents.

What is claimed is:

1. An apparatus for inspecting a host vehicle, comprising:
a memory configured to store failure diagnosis model information for a group of vehicle parts, wherein the failure diagnosis model information is obtained while a test vehicle equipped with each of the group of the vehicle parts in a failure state is driving on a test road at a variety of different test driving conditions of the test vehicle and test road surface conditions of the test road;

a sensor configured to generate information on host-vehicle driving conditions of the host vehicle and current road surface conditions of a current road on which the host vehicle is currently traveling;

a controller configured to:

determine whether the test driving conditions and the test road surface conditions of the test road stored in the memory and the host-vehicle driving conditions and the current road surface conditions for the host vehicle are consistent with each other, and compare the information generated by the sensor with the failure diagnosis model information and determine whether a given vehicle part of the group of the vehicle parts has failed based on the host-vehicle driving conditions and the current road surface conditions for the host vehicle and the test driving conditions and the test road surface conditions being consistent with each other; and a displayer configured to display a warning sign based on that the given vehicle part has failed according to a control signal provided by the controller.

2. The apparatus of claim 1, wherein the failure diagnosis model information is generated with the test vehicle driven at the test driving conditions including a constant speed of 50 km/h to 60 km/h and the test road surface conditions being on a flat road.

3. The apparatus of claim 2, wherein the failure diagnosis model information comprises acceleration data.

4. The apparatus of claim 2, wherein the failure diagnosis model information comprises vibration data.

5. The apparatus of claim 2, wherein the failure diagnosis model information comprises sound data.

6. The apparatus of claim 2, wherein the failure diagnosis model information comprises GPS data.

7. The apparatus of claim 1, wherein the sensor includes:

an acceleration sensor configured to measure acceleration on the current road on which the host vehicle is traveling;

a vibration sensor configured to sense vibration of the given vehicle part;

a noise sensor configured to sense sounds generated from the given vehicle part; and a GPS configured to generate data on a location of the host vehicle.

8. The apparatus of claim 7, wherein the vibration sensor and the noise sensor are placed at one or more of a first position inside a front body of the host vehicle, a second position at a motor of the host vehicle, a third position proximate to a wheel of the host vehicle, a fourth position at a battery of the host vehicle, and a fifth position inside a rear body of the host vehicle.

9. The apparatus of claim 7, further comprising a filter configured to remove noise from data received from the vibration sensor and the noise sensor.

10. The apparatus of claim 1, wherein the controller is configured to inspect different vehicle parts for failures in a turning section and a straight section during driving of the host vehicle.

11. The apparatus of claim 10, wherein the controller is configured to determine whether a motor driven power steering (MDPS) is broken in the turning section and determine whether an electric driving motor is broken in the straight section.

12. A method of inspecting a host vehicle, the method comprising:

storing failure diagnosis model information for each of a group of vehicle parts in a memory, wherein the failure diagnosis model information is obtained while a test vehicle equipped with each of the group of the vehicle parts in a failure state is driving on a test road at a variety of different test driving conditions of the test vehicle and test road surface conditions of the test road;

generating information on host-vehicle driving conditions of the host vehicle and current road surface conditions of a current road on which the host vehicle is currently traveling;

determining whether the test driving conditions and the test road surface conditions of the test road stored in the memory and the host-vehicle driving conditions and the current road surface conditions for the host vehicle are consistent with each other;

comparing sensor information generated by a sensor with the failure diagnosis model information and determining whether a given vehicle part of the group of the vehicle parts has failed based on the host-vehicle driving conditions and the current road surface conditions for the host vehicle and the test driving conditions and the test road surface conditions being consistent with each other; and alerting a driver of the host vehicle that the given vehicle part has failed.

13. The method of claim 12, wherein the generated information includes vibration data of the vehicle parts of the host vehicle, sounds data generated from the vehicle parts of the host vehicle, and location data of the host vehicle.

14. The method of claim 12, wherein the determining of whether the given vehicle part has failed includes inspecting different vehicle parts for failures in a turning section and a straight section of driving of the host vehicle.

15. The method of claim 14, wherein the determining of whether the given vehicle part has failed further includes determining whether a motor driven power steering (MDPS) is broken in the turning section and determining whether an electric driving motor is broken in the straight section.

16. A method of inspecting a host vehicle, the method comprising:

sensing host-vehicle status information, host-vehicle driving conditions, and current road surface conditions on a current road on which the host vehicle is traveling, wherein the host-vehicle status information includes a first measurement of a current condition of a first vehicle part of the host vehicle;

comparing the host-vehicle driving conditions and the current road surface conditions of the current road with test-vehicle driving conditions and tested road surface conditions, wherein the test-vehicle driving conditions and the tested road surface conditions were previously measured on a test road and previously stored in a memory, and wherein the test-vehicle driving conditions and the tested road surface conditions are a first portion of failure diagnosis model information stored in the memory;

based on the host-vehicle driving conditions and the current road surface conditions of the current road being consistent with the test-vehicle driving conditions and the tested road surface conditions measured on the test road, comparing the first measurement with previously measured failure data corresponding to the first vehicle part being in a failed state, to determine whether the first vehicle part is in the failed state; and based on determining that the first vehicle part is in the failed state, generating a first alert corresponding to the first vehicle part.

17. The method of claim 16, further comprising:

determining whether the host vehicle is currently turning; and based on the host vehicle turning, sensing for a second vehicle part of the host vehicle such that the host-vehicle status information includes a second measurement for the second vehicle part, wherein the second vehicle part mainly functions during turning.

18. The method of claim 16, wherein the host-vehicle status information includes vibration measurements from two or more different sensors located in different locations on the host vehicle, and wherein the method further comprises filtering a first vibration measurement of the vibration measurements from a first location with a second vibration measurement of the vibration measurements from a second location, wherein one of the first location or the second location is inside the host vehicle, and wherein another of the first location or second location is outside the host vehicle.

19. The method of claim 16, wherein the host-vehicle status information includes noise measurements from two or more different sensors located in different locations on the host vehicle, and wherein the method further comprises filtering a first noise measurement of the noise measurements from a first location with a second noise measurement of the noise measurements from a second location, wherein one of the first location or the second location is inside the host vehicle, and wherein another of the first location or second location is outside the host vehicle.

20. The method of claim 16, wherein the host-vehicle status information and the host-vehicle driving conditions includes current data measured from multiple different sensors at multiple different locations of the host vehicle, and wherein the current data includes current acceleration of the host vehicle, current velocity of the host vehicle, location of the host vehicle, vibration, and sound.

\* \* \* \* \*